(12) United States Patent
Pulek et al.

(10) Patent No.: US 6,712,966 B1
(45) Date of Patent: Mar. 30, 2004

(54) GRADED PARTICLE-SIZE RETENTION FILTER MEDIUM FOR CELL-TYPE FILTER UNIT

(75) Inventors: John L. Pulek, Cheshire, CT (US); William A. Larsen, Southington, CT (US); Charles Thomas Paul, Madison, CT (US); Clifford L. Schorr, Cheshire, CT (US); Francis J. Swiatek, Stafford Springs, CT (US); Art Artinyan, Belvidere, NJ (US)

(73) Assignee: Cuno Incorporated, Meriden, CT (US)

( * ) Notice: Subject to any disclaimer, the term of this patent is extended or adjusted under 35 U.S.C. 154(b) by 0 days.

(21) Appl. No.: 09/498,251

(22) Filed: Feb. 3, 2000

Related U.S. Application Data (60) Provisional application No. 60/118,603, filed on Feb. 4, 1999.

(51) Int. Cl.[7] ............................ B01D 29/19; B01D 69/10
(52) U.S. Cl. ................... 210/317; 210/486; 210/489; 210/500.27; 210/502.1; 210/505
(58) Field of Search ................. 210/317, 321.6, 210/346, 347, 486, 491, 489, 490, 505, 321.75, 321.77, 321.84, 321.86, 502.1, 503, 504, 508, 509, 500.27, 500.38; 55/487; 428/304.4, 311.11, 311.51, 311.71, 315.5

(56) References Cited

U.S. PATENT DOCUMENTS

| | | | |
|---|---|---|---|
| 2,639,251 A | | 5/1953 | Kracklauer |
| 3,005,556 A | | 10/1961 | Jensen |
| 3,452,877 A | | 7/1969 | Mesek et al. |
| 3,493,119 A | | 2/1970 | Allen |
| 3,618,783 A | | 11/1971 | Cuyler |
| 3,735,871 A | * | 5/1973 | Bisko .................... 210/167 |
| 3,935,110 A | | 1/1976 | Schmid et al. |
| 4,007,113 A | | 2/1977 | Ostreicher |
| 4,007,114 A | | 2/1977 | Ostreicher |
| 4,115,277 A | | 9/1978 | Swank |
| 4,309,247 A | * | 1/1982 | Hou et al. .................... 162/149 |
| 4,347,208 A | * | 8/1982 | Southall ..................... 264/229 |
| 4,430,232 A | | 2/1984 | Doucet |
| 4,606,824 A | | 8/1986 | Chu et al. |
| 4,661,255 A | * | 4/1987 | Aumann et al. ............ 210/491 |
| 4,704,207 A | | 11/1987 | Chu |
| 4,707,265 A | * | 11/1987 | Barnes, Jr. et al. ......... 210/638 |

(List continued on next page.)

FOREIGN PATENT DOCUMENTS

| | | | |
|---|---|---|---|
| DE | 198 37 257 A1 | 2/2000 | |
| JP | 22904 | * 2/1985 | ............ 210/321.84 |
| JP | 3278517 | * 11/1988 | ................ 210/508 |
| JP | 5-2709 | 1/1993 | |
| WO | WO 00/10684 | 3/2000 | |

OTHER PUBLICATIONS

International Search Report dated Jul. 18, 2000 for PCT/US00/02682.
Zeta Plus Generation H Series Filter Cartridge, Sales brochure, 1996.
Zeta Plus Generation 2 Cartridge System, Sales brochure, 1995.
PolyPro XL, Sales brochure, 1997.

*Primary Examiner*—Matthew O. Savage
(74) *Attorney, Agent, or Firm*—R. Thomas Payne

(57) ABSTRACT

A cell-type filter unit having two or more filter media layers and/or zones, at least one of the layers/zones having a different particle retention capability disposed on each side of a non-filtering separator element. The filter media are preferably positioned such that each succeedingly distal filter layer or zone from the separator has a decreased particle retention capability than each proceeding filter layer or zone. The filter media layer most proximal to the separator element may be separated from the separator by a support material for supporting such filter media element and preventing collapsing of the media into any separator conduit.

4 Claims, 2 Drawing Sheets

U.S. PATENT DOCUMENTS

| | | |
|---|---|---|
| 4,714,647 A | 12/1987 | Shipp, Jr. et al. |
| 4,726,901 A | 2/1988 | Pall et al. |
| 4,783,262 A | 11/1988 | Ostreicher et al. |
| 4,859,340 A | 8/1989 | Hou et al. |
| 4,881,313 A | 11/1989 | Artinyan et al. |
| 4,900,346 A | 2/1990 | Lutz |
| 4,981,591 A | 1/1991 | Ostreicher |
| 5,011,555 A | 4/1991 | Sager |
| 5,030,349 A | 7/1991 | Drori |
| 5,055,192 A | 10/1991 | Artinyan et al. |
| 5,062,864 A | 11/1991 | Hasegawa et al. |
| 5,069,789 A | 12/1991 | Mohn et al. |
| 5,085,780 A | 2/1992 | Ostreicher |
| 5,085,784 A | 2/1992 | Ostreicher |
| 5,186,825 A | 2/1993 | Drori |
| 5,221,479 A * | 6/1993 | Etoh et al. .................. 210/636 |
| 5,232,595 A | 8/1993 | Meyer |
| 5,271,838 A | 12/1993 | Rahimi et al. |
| 5,316,678 A | 5/1994 | Heaslip |
| 5,340,479 A | 8/1994 | Szczepanski et al. |
| 5,389,256 A | 2/1995 | McEwen et al. |
| 5,429,745 A | 7/1995 | Ogata et al. |
| 5,433,859 A * | 7/1995 | Degen ........................ 210/651 |
| 5,591,335 A | 1/1997 | Barboza et al. |
| 5,609,947 A * | 3/1997 | Kamei et al. ................ 428/212 |
| 5,641,402 A | 6/1997 | Kohonen et al. |
| 5,716,522 A * | 2/1998 | Chilton et al. .............. 210/317 |
| 5,720,790 A | 2/1998 | Kometani et al. |
| 5,736,042 A | 4/1998 | Aoki |
| 5,820,756 A | 10/1998 | McEwen et al. |
| 5,846,438 A * | 12/1998 | Pall et al. ................... 210/767 |
| 5,902,480 A | 5/1999 | Chilton et al. |
| 5,958,236 A | 9/1999 | Bakula |
| 6,312,609 B1 * | 11/2001 | Solyanik et al. ............ 210/232 |

* cited by examiner

GRADED PARTICLE-SIZE RETENTION FILTER MEDIUM FOR CELL-TYPE FILTER UNIT

This application claims the benefit of U.S. Provisional Application No. 60/118,603 filed on Feb. 4, 1999.

BACKGROUND OF THE INVENTION

1. Field of the Invention

The present invention generally relates to a composite filter medium having two or more filtration zones or layers of different particle-retention capability ("PRC") with respect to the fluid suspension which is filtered under ambient filtration conditions ("composite filter medium") wherein the zones or layers are positioned with respect to one another such that the contaminant-holding capacity ("CHC") per unit area of the composite filter medium is greater than the CHC per unit area of the upstream filtration zone or layer of the composite filter medium when such is extrapolated to the depth of the composite filter medium. More particularly, an embodiment of the present invention relates to a cell-type filter unit employing such composite filter medium. More particularly, an embodiment of the present invention relates to a cell-type filter unit having upper and lower composite filter medium separated by a separator layer wherein the zones or layers of each composite filter medium are positioned with respect to one another such that the CHC per unit area of the composite filter medium is greater than the CHC per unit area of the upstream filtration zone or layer of the composite filter medium when such is extrapolated to the depth of the composite filter medium. More specifically, an embodiment of the present invention relates to a cell-type filter unit having an upper composite filter medium and a lower composite filter medium separated by a non-filtering separator layer, wherein each of the composite filter medium is comprised of two or more zones or layers of filter material of the same or different composition and/or fabrication, each layer being positioned with respect to one another such that the more distal the zone or layer from the separator layer the lesser the PRC with respect to the fluid suspension which is to be filtered under attendant filtration conditions. And yet another embodiment of the present invention relates to a lenticular filter unit having an upper composite filter medium and a lower composite filter medium, separated by a non-filtering separator layer, wherein each composite filter medium is fashioned to have a graded PRC in the direction of flow such that, as positioned on the non-filtering separator layer, the lenticular filter unit is capable of more efficiently retaining smaller and smaller particles as the fluid moves from the surface of the filter medium towards the non-filtering separator layer.

2. Background of the Related Art

Cell-type filter units are well known in the art, and comprise two overlying similarly-shaped filter media separated from one another along the majority of their opposing surface areas by a non-filtering separator element, and affixed to one another along their perimeter edges. Conventionally, the filter media and the separator element each have a central void of about the same shape and dimension so as to form a uniform through bore in the filter unit when each void is aligned.

The separator element is conventionally composed of a material distinct from the composition of the media which abuts it, and generally has openings therein of such size that the separator is substantially non-filtering with respect to the material to be filtered given its position within the cell-type filter unit. In addition to separating the two filter media, and supporting the media under differential pressure, the separator element is generally fashioned to have a plurality of conduits formed therein, such conduits communicating with the central void of the separator and the through bore of the filter unit to allow flow to get from the outer-diameter or edge of the cell-type filter unit to a stacked common bore. Separators are conventionally fashioned from polymeric materials, in particular plastics, although they can also be fashioned from other materials, such as, for example, metals, ceramics and other material known in the art to be capable of separating the two layers effectively in a particular filter application environment.

A separator element may be manufactured to include upper and lower ribs of varying thickness to maintain the media in a disk-shape. Lenticular cell-type filter units, comprising two disk-shaped filter media separated by a closed-curve non-filtering separator element, are particularly common place in the art. Separators used in lenticular filters generally have a plurality of ribs extending radially outward from a central aperture in a spoke-like fashion. An example of a lenticular cell-type filter unit is found in U.S. Pat. No. 4,783,262 to Ostreicher et al., the disclosure of which is herein incorporated by reference.

Generally the outer circumference of the two media discs of a lenticular filter unit are held together by an insert molding process which encapsulates the circumferences in plastic. U.S. Pat. No. 4,347,208 to Southhall, the disclosure of which is herein incorporated by reference, discloses a method of making a filtration cell having a sealed periphery which includes the steps of placing two media discs, and interposed separator, into a mold and injecting a thermoplastic polymer into the mold to form a seal around the two media discs. The Southhall patent discloses polypropylene, polyethylene, nylon, and polysulfone as the preferred thermoplastic polymers for molding the edge seal.

Cell-type filter units use a variety of materials for filtering fluids, including, without limitation, glass fibers, diatomaceous earth, perlite, cellulose, and binder resins. The filter media is typically produced by a wet laid papermaking operation. Media thickness generally ranges between about 0.130–0.218 inches depending on the material formulation. By filter medium it is meant a porous article or mass having a porosity, or carrying/producing a charge, or incorporating matter which binds matter in the suspension, such that it will separate out matter in suspension in the fluid, gas or liquid, which is to be filtered.

Cell-type filter units generally have a through bore and are generally employed in conventional practice by stacking one on another in seriatim to form a common bore, such common bore communicating with one or more separator conduits. The stacked cell-type filter unit assembly, or cell-type filter cartridge, is then enclosed in a housing having an inlet port and an outlet port, the common bore typically being positioned in the housing so as to communicate with the outlet port. Not infrequently, fluid is supplied to the housing at high temperature and/or high pressure. The fluid enters the gaps between the adjacent filter units and then passes through the filter media covering the separator. As the fluid passes through the filter media, undesirable materials such as aggregates and particulates are removed from the fluid. The filtered fluid then flows along the conduits of the separator to the common bore and exits the housing via the outlet tube.

A significant advantage of stacked cell-type filter cartridges is that the surface area of the filter material is quite large when compared to the total volume displaced by the stacked cell-type filter cartridge. This large surface area permits larger volumes of fluid to be filtered, as compared to cartridges displacing a similar volume but which have a lower surface area, over the same period of time. Conventional stacked cell type filter cartridges are useful in a variety of applications, including the filtration of fluids such as beverages, dielectric oils, chemicals, etc. Cell-type filter cartridges find use as both primary filters and pre-filters.

When used as pre-filters, stacked cell-type filter cartridges may be located upstream from another stacked cell-type filter cartridge, or from a filter cartridge of dissimilar construction, e.g. a pleated membrane filter. Owing to their large available surface areas cell-type filter cartridges are frequently used to remove particulates from a fluid stream prior to microfiltration by a membrane filter. The pre-filter is designed to remove particulates which would otherwise plug the membrane, thereby reducing both the filtration flow rate (or at constant flow, increasing the pressure differential through the membrane filter) and reducing the life of the membrane filter. While such dual filtration systems result in a highly purified effluent, the cost involved in maintaining both the pre-filter and qualifying filters is relatively high. Additional operational costs are incurred in using multiple filters in that additional housings must be purchased and installed to incorporate each succeeding filter. Further, there is a downtime cost with respect to the replacement of either filter, one filter not infrequently being optimally replaced at a different time than the other filter.

While multi-layer cell-type filter units are known in the art, additional layers serve purposes other than to increase CHC. For example, Cuno 05UW Zeta-Plus® is constructed of two identical cellulose and glass fiber layers (having the same pore size distribution and charge potential, as well as the same CHC per unit area and PRC) having a water absorbent layer of different materials located there-between. The water absorbent layer is interposed to remove water from an oil filtrate and does not act as a particulate filter medium. The cellulose layers act both as particle retention filters and also as support for the relatively weak water absorbent layer as it swells. A filter of similar construction is also produced commercially by Alsop®. Zeta-Plus® filters are also available having a layer of spunbond polypropylene or polyester non-woven placed between the separator and the cellulosic filter media. The interposed layer does not act as a filter medium, but rather is used to support the filter media, in particular under differential pressure. Zeta-Plus® filters having a layer of spunbond or netting placed on the outer surface of the filter media are also known. Such outer layer is used to provide support in a reverse flow/pressure condition and helps insure that fluid flow is not obstructed between cells if the media faces of two adjacent cells are in contact. Flowtech® also produces a similar commercial product. In neither case does the outer layer act as a filter medium.

A multi-layered construction is also found in the Roki Techno ABSO-AB® Series lenticular filters. In this product two cellulosic filter media layers are disposed on each side of the separator. One thin layer of melt-blown material, of about half the thickness of the overlying cellulosic filter media, is located under the two-layer cellulosic filter media, in contact with the separator—that is the melt-blown material is located between the separator and inner cellulose media layer. The melt-blown material layer is used to reduce medium migration from the cellulosic filter media to the separator. Such melt-blown material layer does not increase particle retention over the cellulosic filter media. The melt-blown material layer, as measured by a Coulter Porometer, has a 12½ micron mean flow pore size versus 2–4 micron mean flow pore size for the cellulose filter media.

Japanese Utility Model 5-2709 also discloses a multi-layer lenticular cell-type filter unit but does not describe the particle retention properties of the layers. No teaching or suggestion is made to incorporate filter medium having two or more layers and/or zones of different PRC, with respect to the fluid suspension, which is filtered, under attendant ambient filtration conditions.

There is, therefore, a need for a more economical filtration system that results in decreased down time due to filter replacement and to provide for highly purified effluent without the need to resort to a dual filter filtration system. Further, it is desirable that the useful life of any qualifying filter used in a process be extended.

SUMMARY OF THE INVENTION

Disclosed is a cell-type filter unit having upper and lower filter media composed of two or more filtration zones or layers of different particle-retention capability ("PRC") with respect to the fluid suspension which is filtered under ambient filtration conditions ("composite filter medium") wherein the zones or layers are positioned with respect to one another such that the contaminant-holding capacity ("CHC") per unit area of the composite filter medium is greater than the CHC per unit area of the filtration zone having the highest PRC on a basis weight (gm/sq-cm) comparison. More particularly, an embodiment of the present invention relates to a cell-type filter unit having an upper and lower composite filter medium separated by a separator layer wherein the zones or layers of each composite filter medium is positioned with respect to one another such that the CHC per unit area of the composite filter medium is greater than the CHC per unit area of the filtration zone or layer of the composite filter medium which has the greatest PRC on a basis weight (gm/sq-cm) comparison.

Particle retention by a filter medium may result, for example, from mechanical (e.g., pore size), chemical (e.g., covalent, hydrophilic bonding) or electro-kinetic interactions (e.g. anionic, cationic binding) between the suspended material which is to be removed and the filter medium.

Particle-retention capability ("PRC") is a measure of the competence of filter medium to retain a diverse size range of particles. When two filter media are indicated to have "different PRCs" it is meant that there is a measurable difference in either the relative-PRC or standardized-PRC. By increased "relative-PRC" of a first filter medium over a second filter medium, it is meant, that given the suspension being filtered, at ambient filtration conditions (pressure, temperature etc.), that the first filter medium is capable of removing particles of smaller size, and/or removing a given particle size more efficiently, than the second filter medium before a significant pressure drop across the medium occurs. As the PRC of a filter medium zone or layer may be affected by numerous parameters depending on the extreme of conditions and the method(s) of particle retention, for example, the pH of the fluid being filtered, the charge on the particles being filtered, the charge on the filter medium, the fluid pressure at which the fluid is filtered, the temperature of the filtered suspension, and the characteristics of the fluid in which the particles are suspended (e.g., bonding affinity between the fluid and the particles), a standardized-PRC measurement has been developed to characterize the ability of filter media to retain a diverse size range of particles with respect to commonly filtered suspensions under commonly encountered filtration conditions. By "standardized-PRC" it is meant the smallest particle size that one basis weight (1 gm/1 sq-cm) of substantially uniformly-fabricated filter medium is able to consistently retain, before a significant pressure drop across the medium occurs, when the filter medium is challenged with 0.2 um–1.0 um diameter spherically-shaped mono-dispersed latex beads (of anionic charge if the filter medium is predominantly positively charge, of cationic charge if the filter medium is predominantly negatively charged, and of neutral charged if the filter medium is predominantly neutrally charged, using serial testing at 0.1 um diameter intervals) suspended in a solution of doubly-distilled water (adjusted to pH 4.0 if the latex beads are anionically-charged, to pH 8.0 if the latex beads are cationically-charged, and to pH 7.0 if the latex beads are neutrally-charged) when such latex beads are suspended at a concentration of 1 mg/deciliter and when such suspension is filtered at STP. When a first filter medium is said to have a "different" standardized-PRC or relative-PRC than a second filter medium, it is meant that the relevant measurement differs by more than about 10%, and more preferably by more than about 25%, and yet more preferably more than about 50%. "Contaminant holding capacity" is a measure of the ability of a unit area of filter medium to retain contaminants. When two medium are indicated to have "different CHCs" it is meant that there is a measurable difference in either the relative-CHC or standardized-CHC. By increased "relative-CHC" of a first filter medium over a second filter medium, it is meant, that for the suspension being filtered, at ambient filtration conditions (pressure, temperature etc.,), that for given a unit area of projected filter medium (that is, projected along its thickness), the first filter medium is capable of retaining more of the particles suspended in the filtered suspension per unit area as opposed to the second filter medium, that is, before a substantial pressure drop across either filter media occurs. As with PRC, due to the number of variables that may affect CHC of a filter medium, including for example, the pH of the fluid being filtered, the charge on the particles being filtered, the charge on the filter medium, the fluid pressure at which the fluid is filtered, the temperature of filtered suspension, and the characteristics of the fluid in which the particles are suspended (e.g., bonding affinity between the fluid and the particles), a standardized-CHC per unit area measurement has been established to characterize the capacity of a projected unit area of most filter media to retain contaminants given exposure to most commonly filtered suspensions and under common filtration conditions. By "standardized-CHC" it is meant the capacity (weight/weight) of a projected area of filter medium, before a significant pressure drop across the medium occurs, to retain a uniformly distributed diverse size-range of spherically-shaped monodispersed latex beads (of anionic charge if the filter medium is predominantly positively charged, of cationic charge if the filter medium is predominantly negatively charged, and of neutral charge if the filter medium is predominantly neutrally charged) having diameters of 0.2 um–1.0 um, at 0.1 um diameter intervals, when such beads are suspended in a solution of doubly-distilled water (adjusted to pH 4.0 if the latex beads are anionically-charged, to pH 8.0 if the latex beads are cationically-charged, and to pH 7.0 if the latex beads are neutrally-charged) when such latex beads are at a concentration of 1 mg/deciliter and when such suspension is filtered at STP. When a first filter medium is said to have a "different" standardized-CHC or relative-CHC per unit area than a second filter medium, it is meant that the relevant measurement differs by more than about 10%, and more preferably by more than about 25%, and yet more preferably by more than about 50%, than the second filter medium.

An embodiment of the present invention includes a cell-type filter unit comprising: an upper filter medium element; a lower filter medium element, a non-filtering separator element disposed between the upper filter medium element and the lower filter medium element, and a sealing edge operatively connecting said elements along their edges; wherein the lower and upper filter medium are each comprised of at least two zones of filter material, each zone having different PRC, such that at least one zone of each medium is disposed proximal to the separator element and at least one zone of each medium is disposed distal to the separator element. The zones may be integral with one another or separate layers operatively connected to one another.

In a particularly preferred embodiment of the present invention, the upper filter medium elements and lower filter medium elements on each side of the separator element of the cell-type filter unit comprise, or consist of, 30%–50% cellulose, (e.g., Weyerhaeuser Kraft Kamloops™), and balance conventional filter aids (50%–70%), such as diatomaceous earth (e.g., Celite 507™, Standard SuperCel™), and perlite (e.g., Harborlite™), and are generally of the same composition. The upper filter medium elements on each side of the separator element are fabricated in such a manner (as would be known by those of ordinary skill in the art—including changing the grade of the filter aid used, or the method or degree of refining/fibrillation of the pulp) such that the overall average pore in the media is substantially more open than those pores found in the lower filter medium elements. Differences between the average pore size between the upper filter medium element and lower filter medium element on each side of the separator element should eventuate in a difference in airflow pressure across the filter medium element of more than about 10%, more preferably more than about 25%, and yet more preferably more than about 50%. Preferably the dimensions of the upper filter medium element and lower filter medium element on each side of the separator are substantially the same.

Another embodiment of the present invention includes a cell-type filter unit comprising: an upper filter medium element having top, bottom and edge surfaces; a lower filter medium element having top, bottom and edge surfaces; a non-filtering separator element disposed between said bottom surface of said upper filter medium element and said top surface of said lower filter medium element in such a manner to be anterior to said lower filter medium element and posterior to said upper filter medium, and a sealing edge operatively connecting said lower and upper filter medium elements along their edges, wherein said lower and upper filter medium have a graded PRC from said top surface to said bottom surface of said filter media such that when a suspension containing a diverse particle-size distribution flows from said top surface to said bottom surface more small particles are retained as the depth from the top surface increases.

And yet another aspect of the present invention includes a cell-type filter unit comprising: an upper filter medium element having top, bottom and edge surfaces; a lower filter medium element having top, bottom and edge surfaces; a non-filtering separator element disposed between said bottom surface of said upper filter medium element and said top surface of said lower filter medium element in such a manner to be anterior to said lower filter medium element and posterior to said upper filter medium, and a sealing edge operatively connecting said lower and upper filter medium along their edges, wherein said lower and upper filter medium have a graded pore-size from said top surface to said bottom surface of said filter media such that a larger number of relatively larger pore sizes are found preferentially toward the top surface, whereas a larger number of relatively smaller size pore sizes are found toward said bottom surface of the filter media, and pore size varies as a function of depth into the filter medium.

A further embodiment disclosed is a cell-type filter cartridge comprising: a plurality of cell-type filter units, each cell-type filter units having an upper filter medium element surrounding a central void; a lower filter medium element surrounding a central void, a non-filtering separator element surrounding a central void disposed between the upper filter medium element and the lower filter medium element, and a sealing edge operatively connecting lower and upper filter medium elements along their edges, mounted generally parallel to and spaced from one another such that the a central continuous bore is formed there-between, wherein the filter media of the cell-type filter units are each comprised of at least two zones of filter material each layer having a different PRC. The zones may be integral with one another or separate layers operatively connected to one another.

Still another aspect of the present invention includes multi-layer filtration media prepared by a process comprising the steps of: providing a first set of filter media, each filter medium having about the same dimension, shape and PRC; providing a second set of filter media, each filter medium having about the same dimension and shape as, and having a PRC different than that of said first set of filter media; providing a separator element of about the same shape and dimension as said filter medium of said first and second set of filter media, said separator element significantly lacking filtering capability; operatively assembling the first set of filter media, the second set of filter media and the separator element to form a composite structure; and operatively joining the filter media of said composite structure along the edges of the filter media to seal the outer edge thereof.

Other objects and advantages of the invention will be apparent from the following description, the accompanying drawings and the appended claims.

DETAILED DESCRIPTION OF THE INVENTION

There is disclosed a cell-type filter unit having one or more filter media installed on each side of a separator element, the separator element being of such composition as to have minimal, if any, filtering capability for the fluid to be filtered at its position in the unit, but being sufficient to effectively separate the filter media on each side thereof, and each filter media comprising two or more zones or layers of filter material which differ in their ability to retain different-sized particles and/or total contaminant mass given ambient filtration conditions. The two or more zones or layers may comprise one or more sheets of filter media, which may be composed of similar materials (in which the materials are formulated and processed to create a media with different retention capabilities), or may be composed of different materials having distinctly different particle retention characteristics. The two or more zones or layers may be contiguous or non-contiguous with one another as long as the fluid being filtered communicates between the zones or layers.

Filter media having different PRC may be produced discretely by standard manufacturing methods. Such media may then be physically stacked onto each other to create finished multi-layer media structure within a cell. Alternatively, the multi-zone media structure may be produced by forming a first media zone of a certain PRC by standard manufacturing methods, and then overfelting this first media zone with other media zones of different PRC. Such alternative methodology yields a single contiguous sheet of media, which contains multiple filtration zones. This sheet can be assembled into a cell in the selected orientation.

In a presently preferred embodiment, a first filter medium zone capable of retaining the smallest particle sizes, as compared to other filter medium zone, is located adjacent to the separator (downstream side) to act as the qualifying zone which determines particle removal efficiency. Each succeeding filter medium zone installed distal to the first filter medium (i.e., upstream) is less capable of removing smaller-sized particles than the filter medium more proximal to the separator. That is, preferably the PRC of the filter media zones increase in the direction of fluid flow so that contaminants that are desired to be removed are progressively retained throughout the filter medium thickness as a function of the filtered particle size and proximity from the separator. Preferably the zones or layers on one side of the separator are substantially the same in construct (fabrication, composition, dimension and charge) and positioned in the same manner with respect to the separator.

In cell-type filter units having two or more filter media elements of graded PRC, preferably the gradation is such that the PRC increases from upstream (from the filtering surface of the filter medium) to downstream (adjacent to the separator). An advantage of such gradation, is that the CHC of the combined layers is greater than the CHC of either layer alone, even when such layers individually are taken to the same depth of the combined layers.

The PRC of the filter media may be varied by altering the composition, which makes up the media, and/or fabrication of the media. For example, Zeta-Plus® filter media is made from a combination of fiber, filter aids and resin. Fibers, such as cellulose, glass or synthetic fibers, may be selected to alter the PRC. PRC may also be affected by the particular filter aid chosen, such as one of the variety of grades of Diatomaceous Earth (DE) or Perlite. Likewise, variation of the resin that is incorporated to act as a binder may also effect PRC due to the electrokinetic properties imparted by the resin to the media. PRC of materials of the same general composition may be altered by varying the ratio of the components, for example, the amount of cellulose used.

PRC may also be modified by changes in the process used in making or fabricating the filter media, as, for example, in adding a calendering operation to densify the media.

As stated above, the filter media may be comprised of one or more zones made from dissimilar material. One zone, for example, could be of a Zeta-Plus® construct, while the other zone may be a media typically used in a pleated filter, such as a melt-blown material, a membrane, etc. Typically, the thickness of such zones will need to be adjusted such that they can be made into a cell unit using conventional machinery. Each media filtration zone may be produced discretely by its own standard manufacturing methods and then physically stacked onto the other media filtration layers to create a finished multi-layer structure within the cell unit. It is preferred that the media layer having the highest PRC be located as the downstream zone. When Zeta-Plus® media is used as the upstream filtration zone, the downstream zone may advantageously be a calendared melt-blown polypropylene media of the type used in the Polypro XL® pleated filter, or a symmetric cast nylon membrane of the type used in Cuno's Zetapor® or BevAssure® pleated filter. An asymetric cast nylon membrane may also be used. When the Zeta-Plus® media is used as the downstream filtration zone, the upstream zone may advantageously include an un-calendared melt-blown polypropylene media of the type used in the more open retention ratings of the Polypro XL® pleated filter.

The filter media may alternatively be comprised of one or more zones made from a material of substantially the same construct (formulation and fabrication) and charge (i.e., having substantially the same zeta-potential). In such case, the PRC of each zone is directly correlateable with the air flow resistance across the medium zone (i.e., the higher the air flow resistance, the greater the PRC). Preferably the zone oriented most-upstream (in a fluid flow) will have a smaller air flow resistance (and therefore the pressure) and therefore lower PRC, than the each succeeding downstream zone. Preferably the difference in air flow resistance between each succeeding zone differs by more than about 10%, preferably more than about 25%, and yet more preferably more than about 50%, but not more than 80%.

The filter media zone most proximal to the separator element may be separated from the separator by an intervening support material for supporting such filter media zone and preventing intrusion of the any portion of the filter media zone under pressure differential into any conduit, groove or indentation in the separator. Support zones may also be interposed between filter media zones.

Although standard media thickness may be utilized for each filter media zone in the multi-zone filter medium cell-type filter, it is preferred that the total filter medium thickness in the multi-zone cell-type filter be about 0.13 to 0.218 inches. Such total filter medium thickness is preferred as the increase in total filter media thickness per cell may cause a significant reduction in the number of cells and ultimately reduce the associated filter surface area in a defined cartridge housing.

The thickness of each zone in a multi-zone filter medium may differ. In order to require minimum modifications to presently employed cell-type filter unit assembly equipment and molds, it may be preferred to limit zones additional to a filter medium zone of standard thickness (between about 0.1 to about 0.25 inches) to membrane-like thickness, and in particular to less than about 30 mils. Any thin membrane that increases particle removal efficiency performance versus the overlying filter medium layer may be used in conjunction with a filter medium of standard thickness. Presently preferred are zones comprising melt-blown media, particularly polypropylene material (e.g., Polypro®XL) and cast nylon microporous membrane (e.g., Zetapor®).

The separator preferably should support the filter media under differential pressure while providing flow conduits for the clean fluid to exit the cell.

Filter units of the present invention may be stacked in a conventional manner to form a cartridge. Cell-type filter units are preferably stacked along a central axis. Typically, the number of units making up such a cartridge are known to vary between 2–21 cells, commonly about 16 cells.

While a membrane filter medium zone may contact directly onto each side of the separator, a support material zone may be interposed between any such zone and the separator to add protection against abrasion, collapse, etc. The support material zone should preferably be relatively stiff and strong, but have a relatively open pore size such that it does not contribute significantly to change in pressure, or act as a filter medium.

Presently preferred materials include spun bound nonwoven material (e.g., Typar®, Reemay®) or a plastic netting (e.g., AET Plastinet®, Conwed Vexar®). Preferably, the support material and the filter medium zones are sealed together in their outer perimeters, presently preferably, by an injection molded polymeric edge seal, or by other process and materials, that provide support to perform the sealing function.

Preferably the filter medium, separator, and any support material are centered about a central void of the same size and dimension. In a lenticular filter, such void is generally circular. Presently it is preferred that the filter media are bounded along their perimeters by an insert molding process that encapsulates the perimeters in plastic. Sealing along the central void perimeter may be provided by axial compressive forces generated during cartridge-housing installation for double-open end ("DOE") style cartridges, or by assembly force for single open end ("SOE") cartridge, or by other methods presently known in the art.

As would be readily apparent to one of ordinary skill in the art from the present disclosure, the multi-zone cell-type filter unit of the present invention provides for significant advantages over cell-type filter units of the prior art. By incorporating additional filter medium zones having larger PRCs and/or CHCs into a conventional cell-type filter unit in the manner described, particle removal efficiency and retention performance of the stacked filter assembly is significantly improved without affecting the life of the filter unit. Another major benefit for the filter customer is improved filtration economics. As previously noted, in many filtering process applications, stacked cell-type filter unit cartridges are used as a pre-filter to a downstream membrane filter. By incorporating the membrane media into the pre-filter assembly in the manner described, the downstream membrane filter and its housing may be eliminated or its useful life significantly lengthened (if it can't be removed from service due to integrity test requirements). Further, less down time would be anticipated to be spent in checking and replacing one filter rather than in checking and replacing two filters. One also gets, for a wide variety of filter media, the benefits of longer life with the same PRC versus that of single layer media. The examples which follow are representative of a few of the many scenarios in which such filter construct might find advantageous use.

EXAMPLE 1

A customer is currently using a ZetaPlus® grade 60S product. The customer asserts that the product provides acceptable in-line life, but only marginally meets the effluent quality standards that it demands. While a tighter 90S grade ZetaPlus® is found to provide the desired effluent quality, it is deemed by the customer to provide for an unacceptable life. By serially-combining the two filter media, the necessary effluent quality and longer in-line life may be obtained, however, the serial combination would require installation of a second housing which unacceptably adds to the client's capital and operational costs. Further, the client understands that there is greater down time involved in replacing filters that are housed in separate housings. A graded pore size ZetaPlus® cartridge with 60S and 30S grade layers is found to be the best option since it maintains the acceptable in-line life, while improving effluent quality, without the need to install and maintain a second housing.

EXAMPLE 2

A customer is currently using a ZetaPlus® grade 50S product as a pre-filter to a downstream membrane filter. The customer asserts that the combined filters meet the effluent quality standards that it demands, but fails to meet its requirement for in-line life. A more open 30S grade of ZetaPlus®, while not significantly affecting effluent quality, is found to reduce in-line life by permitting more rapid build-up on the membrane filter. A tighter 60S grade, while not significantly affecting effluent quality, is found to reduce in-line life by permitting more rapid build-up on the 60S media. A media of graded-pore size construction from 30S to 60S is found to increase in-line life by minimizing build-up on both the membrane and graded-pore size pre-filter.

EXAMPLE 3

A customer is currently using a ZetaPlus® grade 90S product as a pre-filter to a downstream membrane filter. The customer asserts that the combined filters provide acceptable in-line life, but only marginal to unacceptable effluent quality, as it allows the membrane to plug and have a short service life. No tighter ZetaPlus® grade exists than the grade 90S product. One option is to install a non-ZetaPlus® media prior to the membrane that traps more particulates, such as the Polypro XL 020P1 pleated filter medium. This option provides good effluent quality and in-line life but requires another type of housing to be inserted in-line adapted for housing the Polypro XL 020P1 pleated filter medium, thus adding to capital and operational costs. Adding the Polypro XL 020P1 medium between the 90S medium and the membrane also permits enhanced in-line life, however, requires yet a third housing to be place in line with the other housings, again adding to capital and operational costs. Another option is to provide a filter medium comprised of layered ZetaPlus® grade 90S and Polypro XL 020P1 in place of the ZetaPlus® grade 90S pre-filter alone. Such system does not require a third filter housing, and if fabricated in the shape of the ZetaPlus® grade 90S filter, a new housing to fit the filter. Such system would provide good in-line filter life and good effluent quality. A third option is to provide a layered ZetaPlus® grade 90S and membrane medium in the shape of the ZetaPlus® grade 90S pre-filter, which would also provide good in-line filter life and effluent quality.

Referring now to the drawings, wherein like reference numerals identify similar structural elements of the subject invention, and which set forth representative embodiments of the present invention, additional advantages of the present invention become readily apparent.

Figure 1:
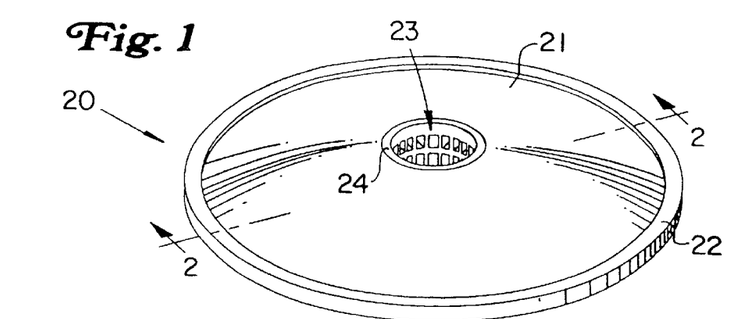
FIG. 1 is a side perspective elevational view of a representative embodiment of a cell-type filter unit of the present invention.

Referring to FIG. 1, there is shown a side perspective elevational view of a representative lenticular cell-type filter unit 20, having a relatively large upper filter medium filtration area 21, an outer edge seal 22 disposed along the circumference of the filter cell, to retain the various components of the filter cell, and an aperture void 23.

Figure 2:
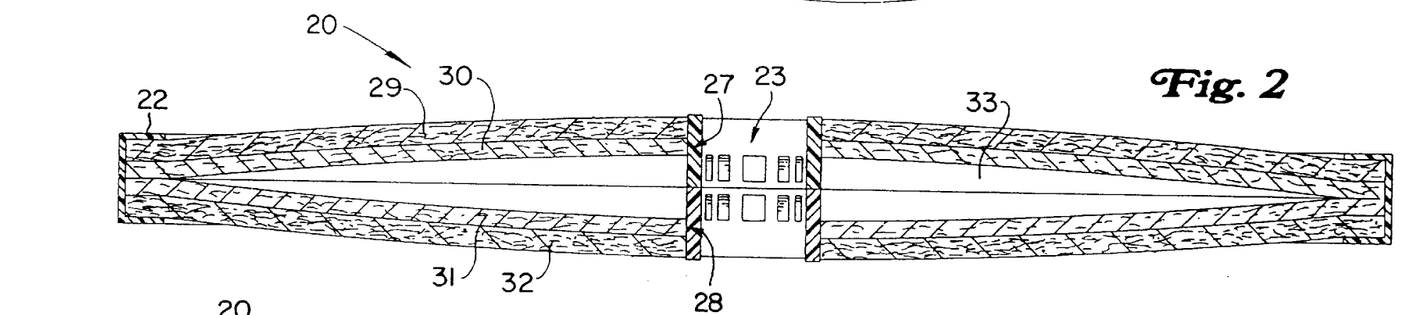
FIG. 2 is a cross-section view of the representative cell-type filter unit of FIG. 1, cut along the 2–2' line, having two filter media layers of equal thickness but different construction.

Now referring to FIG. 2, there is shown a cross-section of a representative lenticular cell-type filter unit 20 cut along the 2—2 line of FIG. 1, wherein the cell-type filter unit includes an upper 27 and lower 28 filter medium structure. As can be seen upper filter medium structure 27 is composed of a first upper filter medium layer 29 and a second upper filter medium layer 30. In a similar manner, lower filter medium 28 is composed of a first lower filter medium layer 32 and a second lower filter medium layer 31. As illustrated, first upper filter medium layer 29 and second upper filter medium layer 30, as well as first lower filter medium layer 32 and second lower filter medium layer 31, may be generally of the same thickness. The first, 29, 32, and second, 30, 31, filter medium layers of the present invention are manufactured to have different PRCs. Upper filter medium 27 and lower filter medium 28 may be circular in shape and joined by a circular edge seal 22 which grips the upper filter medium 27 and lower filter medium 28 filter media on either side to form a liquid tight seal at the circumference of the unit. Lenticular cell-type filter unit 20 also includes a separator element, generally indicated at 33.

Figure 3:
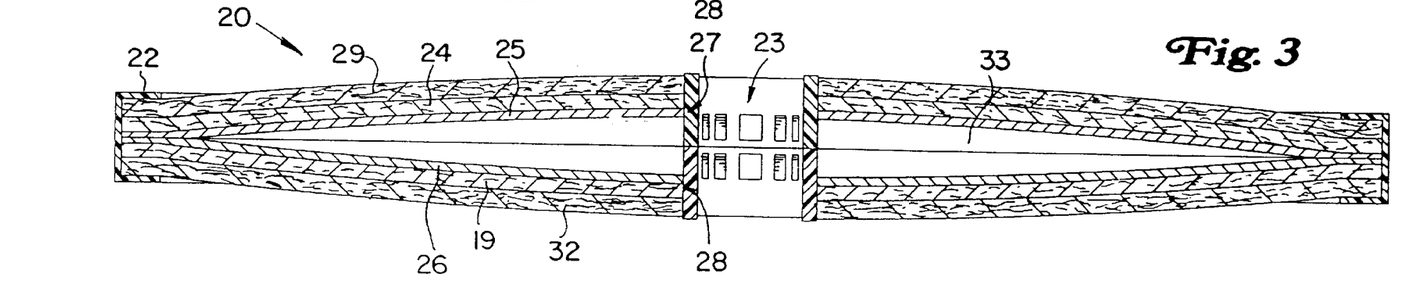
FIG. 3 is a cross-section view of the representative cell-type filter unit of FIG. 1, cut along the 2–2' line, having a filter media layer, a thin filtration membrane layer, and a thin support layer.

Now referring to FIG. 3, there is shown a cross-section of the a representative lenticular cell-type filter unit 20 cut along the 2—2 line of FIG. 1, wherein the cell-type filter unit includes an upper 25 and lower 26 support layer interior to upper membrane filter layer 24, lower membrane filter layer 19, which in turn is interior to upper filter medium 29 and lower filter medium 32. Upper filter medium 29 and lower filter medium 32 are manufactured to have different PRC than upper membrane filter layer 24 and lower membrane filter layer 19. Upper 25 and lower 26 support layers provide, respectively, support to upper membrane filter layer 24 and lower membrane filter layer 19.

Figure 4:
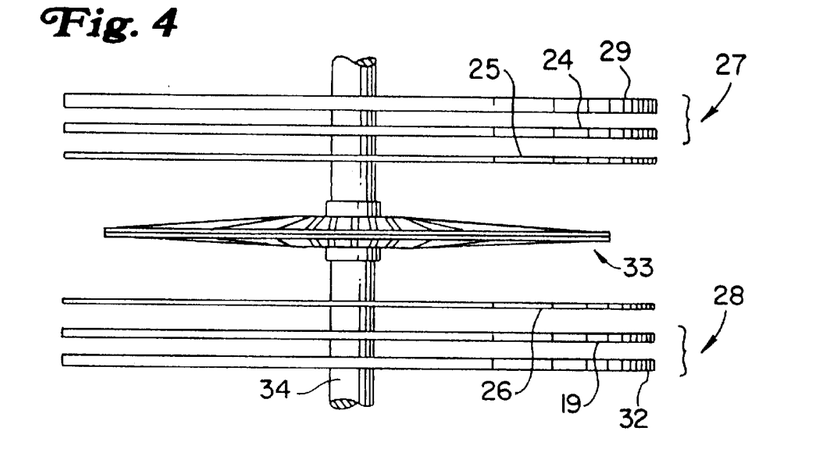
FIG. 4 is a side elevational view showing assembly of the individual components of a cell-type filter unit embodiment of FIG. 3.

Now referring to FIG. 4, there is shown a side elevational representation showing assembly process of the individual components of the cell-type filter unit of FIG. 3 using a representative cell unit assembly mandrel 34. Separator 33 is initially placed on mandrel 34. One either side of separator 33 is upper 25 and lower 26 support layers, followed by upper membrane filter layer 30 and lower membrane filter layer 31, respectively, such membrane filter layers capable of retaining relatively smaller-sized particles than upper filter medium 29 and lower filter medium 32 which follow thereafter. In one embodiment (not shown), filter medium layers 29 and 32, relatively large pore size filter media, are further covered by a filter netting to aid in holding the filter medium together.

Figure 5:
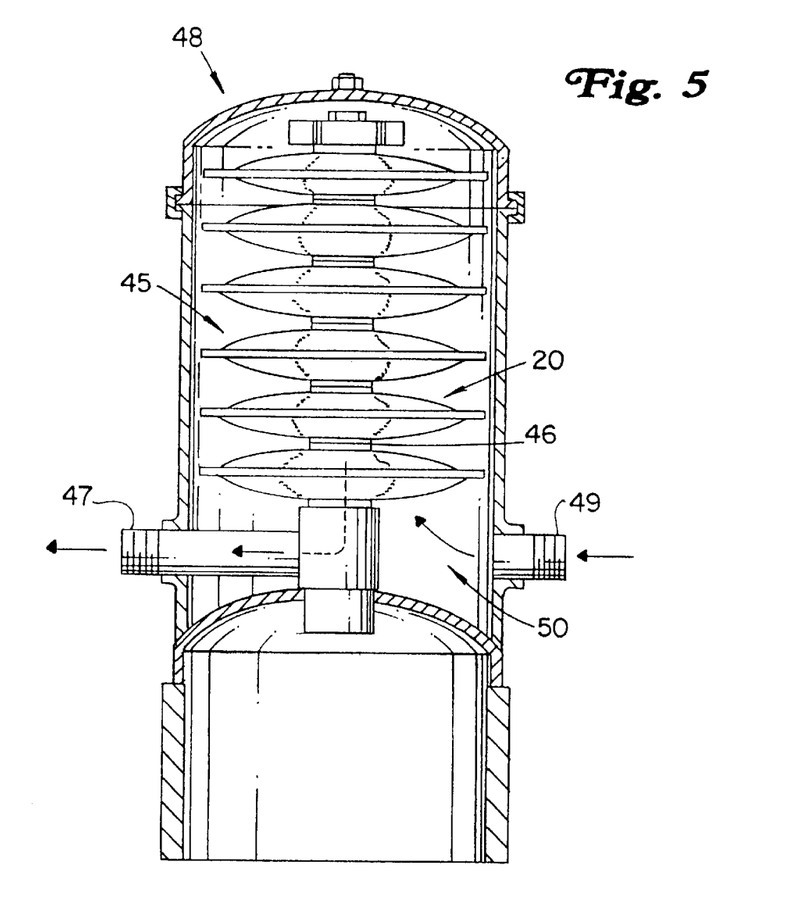
FIG. 5 is a perspective view of a representative lenticular filter unit assembly having cell-type filter units of the present invention.

Turning now to FIG. 5, there is shown a perspective view of a representative lenticular cell-type filter unit assembly 45 comprising a plurality of cell units of the present invention positioned in filter housing 48. Filter assembly 45 is comprised of a series of stacked lenticular cell-type filter units 20 positioned about a central axis 46 communicating with out-take pipe 47 of filter housing 48. In operation, the fluid to be filtered is passed through inlet pipe 49 into housing interior 50. The fluid passes through the filter medium of filter cell 20 and is conducted by conduits in separator 33 (not shown) to central axis 46 and out of out-take pipe 47.

In order to demonstrate the efficacy of the presently described invention with respect to commercially available grades of lenticular filter material, a series of experiments (Examples 4–6) were undertaken using Zeta-Plus™ brand filter media having different degrees of pore openness designated by grade.

Permeability of the filter media was measured as the pressure drop in inches of water when 20 SCFH of air was passed through a three-inch diameter, 7.1 square inch, -cross section of the media. Life expectancy of the filter, as well as efficiency of filtration, was adjudged by challenging the filter media with a cell lysate prepared as follows:

E. coli ATCC #49696 was grown in Luria-Bertani Broth (10 g/l tryptone, 5 g/l yeast extract, 10 g/l NaCl, distilled water 5 liters). Cells were cultured until they reached mid to late exponential stage, and then centrifuged down to a pellet at 17,000×g (10,000 RPM in a JA-10 rotor) for 30 minutes at 4° C. The cells were then re-suspended in 10 mM Tris HCl (ph 8.0), respun, and washed once more. After the second washing phase, the cells were lyzed by re-suspending the pellets (1 g/80 ml) in 30 mM Tris HCl (pH 8.0) containing 20% sucrose. After stirring from 60 to 90 minutes, potassium EDTA and lysozyme were added to 10 mM and 0.5 mg/ml respectively. The resulting solution was stirred for 30–45 minutes. The cell solutions were then aseptically returned to centrifuge tubes and a pellet was obtained. The pellets were re-suspended in sterile distilled water and the tubes were placed into a freezer at −70° C. overnight. The tubes were then allowed to thaw. Such freeze/thaw procedure was repeated a total of three times to ensure adequate lysis. After the final freeze/thaw, the tubes were pooled and stirring was performed for at least 30 minutes. In order to minimize enzymatic breakdown of the lysate components by various proteases, the lysate was placed in a refrigerator at 4° C. or freezer at −20° C.

Filter life was adjudged by the initial volume of filtrate passed through the filter to reach 20 psid over initial pressure (measured in gallons/ft$^2$). Efficiency was adjudged from the clarity of the filtrate collected from the filtration system tested. Challenge with the cell lysate was carried out at a pH of about 6.8 to 7.3.

EXAMPLE 4

Full-thickness 60 grade medium was compared to half-thickness 60 grade medium combined with either half-thickness 30, or half thickness 10, grade medium. When combined the two half-thickness filter media were of the same dimension as the full thickness 60 grade medium. Likewise, each half-thickness filter medium layer was substantially dimensioned the same as the other. As demonstrated by the data in Table 1, life of the filter was dramatically improved by combining half-thickness 30 grade medium to half-thickness 60 grade medium as compared to full-thickness 30 or 60 grade alone. Addition of half-thickness 10 grade medium with the half-thickness 60 grade medium provided significantly improved life over full thickness 30 and 60 grade medium, and the combined half-thickness 30/60 grade media. No practically significant difference between filter efficiencies was discerned between the grades and grade combinations.

TABLE 1

| Grade | Life | UPPER LAYER | | LOWER LAYER | |
|---|---|---|---|---|---|
| | | Weight | Permeability | Weight | Permeability |
| 30 | 23.8 | — | — | 16.3 | 17 |
| 60 | 8.9 | — | — | 17.6 | 93 |
| 30/60 | 28.8 | 8.3 | 12 | 9.6 | 63 |
| 10/60 | 36.5 | 8.7 | 8 | 9.6 | 63 |

EXAMPLE 5

Full-thickness 90 grade medium was compared to half-thickness 90 grade medium combined with either half-thickness 60, half thickness 30, or half-thickness 10, grade medium. When combined the two half-thickness filter media were of the same dimension as the full thickness 90 grade medium. Likewise, each half-thickness filter medium layer was substantially dimensioned the same as the other. As demonstrated by the data in Table 2, life of the filter was dramatically improved by combining half-thickness 10, 30 and 60 grade medium to half-thickness 90 grade medium as compared to full-thickness 90 grade alone. Improvement in life of the filter paralleled the openness of the particular grade. No practically significant difference between filter efficiencies was discerned between the grades and grade combinations.

TABLE 2

| Grade | Life | UPPER LAYER | | LOWER LAYER | |
|---|---|---|---|---|---|
| | | Weight | Permeability | Weight | Permeability |
| 90 | 4.06 | — | — | 16.9 | 196 |
| 60/90 | 5.59 | 9.6 | 63 | 7.7 | 92 |
| 30/90 | 17.74 | 8.3 | 12 | 7.7 | 92 |
| 10/90 | 43.3 | 8.7 | 8 | 7.7 | 92 |

EXAMPLE 6

Half-thickness 120 grade medium was combined with either half-thickness 60, half-thickness 30, or half-thickness 05, grade medium to form combination filters of approximately the same dimension. As demonstrated by the data in Table 3, life of the filter was dramatically improved by up to 60 grade, but remained relatively flat, or slightly diminished, thereafter. No practically significant difference between filter efficiencies was discerned between the grade combinations.

TABLE 3

| Grade | Life | UPPER LAYER | | LOWER LAYER | |
|---|---|---|---|---|---|
| | | Weight | Permeability | Weight | Permeability |
| 90/120 | 1.38 | 7.7 | 92 | 12.7 | 276 |
| 60/120 | 4.24 | 9.6 | 63 | 12.7 | 276 |
| 30/120 | 4.05 | 8.3 | 12 | 12.7 | 276 |
| 05/120 | 3.97 | 8.9 | 2 | 12.7 | 276 |

While the invention has been described with respect to preferred embodiments, those skilled in the art will readily appreciate that various changes and/or modifications can be made to the invention without departing from the spirit or scope of the invention as defined by the appended claims.

What is claimed is:

1. A filter unit comprising:

an upper composite filter medium;

a lower composite filter medium;

a non-filtering separator element having a central void, operatively positioned between the upper composite filter medium and the lower composite filter medium, for facilitating liquid flow from the central void of the separator element and through the filter unit to allow liquid to move from an outer surface of the filter unit to a center bore and out through the center bore; and structure operatively connecting the lower composite filter medium and the upper composite filter medium at the outer periphery thereof, wherein the upper and the lower composite filter mediums each comprise:

a first zone of filter material positioned distal to the separator element and comprising fibrous material and filter aids; and a cast polymeric symmetric or asymmetric microporous membrane positioned more proximal to the separator element than the first zone, the microporous membrane having an increased relative-PRC compared to the relative-PRC of the first zone.

2. The filter unit of claim 1 further comprising:

a support zone, operatively positioned between the non-filtering separator element and the zone most proximal to the non-filtering separator element, for supporting the zone most proximal to the non-filtering separator element.

3. The filter unit of claim 2 wherein the support zone comprises:

a spun bound non-woven material.

4. The filter unit of claim 2 wherein the support zone comprises:

plastic netting.

* * * * *